US012154397B2

(12) United States Patent
Lovett

(10) Patent No.: US 12,154,397 B2
(45) **Date of Patent: *Nov. 26, 2024**

(54) UNTRUSTED USER MANAGEMENT IN ELECTRONIC LOCKS

(71) Applicant: ASSA ABLOY Americas Residential Inc., New Haven, CT (US)

(72) Inventor: Matthew Denton Lovett, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,747

(22) Filed: Aug. 11, 2023

(65) Prior Publication Data

US 2024/0046722 A1 Feb. 8, 2024

Related U.S. Application Data

(63) Continuation of application No. 17/491,908, filed on Oct. 1, 2021, now Pat. No. 11,776,333.

(60) Provisional application No. 63/086,649, filed on Oct. 2, 2020.

(51) Int. Cl.
*G07C 9/00* (2020.01)
*G07C 9/25* (2020.01)

(52) U.S. Cl.
CPC .......... *G07C 9/00174* (2013.01); *G07C 9/25* (2020.01); *G07C 2009/00769* (2013.01)

(58) Field of Classification Search
CPC .................. G07C 9/00174; G07C 9/25; G07C 2009/00769; G07C 9/00817; G07C 9/37; G07C 9/00563; G07C 9/00; H04L 29/06
USPC ........................................................ 340/5.61
See application file for complete search history.

(56) References Cited

U.S. PATENT DOCUMENTS

| | | | |
|---|---|---|---|
| 6,498,861 | B1 | 12/2002 | Hamid et al. |
| 7,039,221 | B1 | 5/2006 | Tumey et al. |
| 9,342,674 | B2 | 5/2016 | Abdallah et al. |
| 9,552,684 | B2 | 1/2017 | Bacco et al. |
| 10,447,683 | B1 | 10/2019 | Loladia et al. |
| 10,492,066 | B2 | 11/2019 | Tarmey et al. |
| 10,977,483 | B2 | 4/2021 | Hayase et al. |
| 11,004,282 | B1 | 5/2021 | Bajaj et al. |
| 11,138,302 | B2 | 10/2021 | Figueredo De Santana et al. |

(Continued)

OTHER PUBLICATIONS

U.S. Appl. No. 63/241,804, entitled "Establishment of Secure Bluetooth Connection to Internet of Things Devices, Such as Electronic Locks".

*Primary Examiner* — Nam V Nguyen
(74) *Attorney, Agent, or Firm* — Merchant & Gould P.C.

(57) ABSTRACT

A biometric wireless electronic lockset includes a processor, a battery, a memory communicatively connected to the processor, a user interface, a wireless communication interface, a locking bolt, a motor, and a biometric sensor. The processor is configured to execute instructions which cause the processor to compare stored biometric data to a received first biometric data. Each known user entry includes a user identity of a known user, biometric data, and an indication of whether the known user is an authorized user. Based on a determination that the first biometric data corresponds to a known user entry and whether or not the known user is an authorized user or an unauthorized user, a plurality of responses may be generated.

20 Claims, 9 Drawing Sheets

(56) References Cited

U.S. PATENT DOCUMENTS

| | | | | |
|---|---|---|---|---|
| 11,776,333 | B2 * | 10/2023 | Lovett ...................... | G07C 9/25<br>340/5.61 |
| 2016/0055692 | A1 | 2/2016 | Trani | |
| 2016/0092665 | A1 | 3/2016 | Cowan et al. | |
| 2017/0185761 | A1 | 6/2017 | Stanwood et al. | |
| 2020/0202866 | A1 | 6/2020 | Langenberg et al. | |
| 2022/0019646 | A1 | 1/2022 | Bielby et al. | |
| 2022/0044505 | A1 | 2/2022 | Eickhoff et al. | |
| 2022/0051498 | A1 | 2/2022 | Hart et al. | |

* cited by examiner

UNTRUSTED USER MANAGEMENT IN ELECTRONIC LOCKS

CROSS-REFERENCE TO RELATED APPLICATIONS

The present application is a continuation of U.S. patent application Ser. No. 17/491,908, filed Oct. 1, 2021, now U.S. Pat. No. 11,776,333; which claims priority from U.S. Provisional Patent Application No. 63/086,649, filed Oct. 2, 2020, the disclosures of which are hereby incorporated by reference in their entireties

TECHNICAL FIELD

This invention relates to the field of electronic locks. More particularly, it relates to user management for trusted and untrusted users of an electronic deadbolt.

BACKGROUND

Electronic deadbolts are well known. Many electronic deadbolts include a keypad that allows users to enter a passcode to unlock the lock. In some cases, the keypads have physical buttons that the users press to enter passcodes while others include touch buttons or touch screens that operate on capacitive touch. With a touch screen lock controller, the keypad is able to sense touches of the user's finger on the keypad surface without the mechanical parts of a physical button. The user may engage the deadbolt and disengage the deadbolt through tactile input into the lock controller via the touch screen. In some instances, each user may be associated with a unique passcode that would separately identify each user when entered by that user. Additionally, in some instances, electronic deadbolts may include alternative user validation mechanisms, such as one or more biometric sensors. In such instances, a biometric sensor may be used to identify a particular user and selectively engage or disengage the deadbolt accordingly.

Electronic deadbolts are controlled by an administrative user. The administrative user has the ability to determine and control authorized and unauthorized users, and therefore determine who is able to unlock the deadbolt.

SUMMARY

In general terms, this disclosure is directed towards a locking assembly for use on internal and external doors. This disclosure is related generally to an electronic lock with enhanced means of visibility of users and user-access attempts.

In a first aspect, a biometric wireless electronic lockset is described. The electronic lockset includes a processor, a battery, a memory communicatively connected to the processor, a user interface, a wireless communication interface, a locking bolt movable between a locked and an unlocked position, a motor actuatable by the processing unit to move the locking bolt between the locked and unlocked positions, and a biometric sensor communicatively connected to the processing unit and configured to receive biometric data. The processor is configured to execute instructions stored in the memory. The instructions cause the processor to perform the following steps. Receiving from the biometric sensor a first biometric data. The first biometric data is compared to stored biometric data in the memory. The stored biometric data comprises a plurality of known user entries. Each known user entry includes a user identity of a known user, biometric data, and an indication of whether the known user is an authorized user. Based on a determination that the first biometric data corresponds to an entry among the plurality of known user entries and that the known user is an authorized user, the motor is actuated to move the locking bolt from the locked position to the unlocked position. Based on a determination that the first biometric data does not correspond to any entries among the plurality of known user entries, generate an error response at the user interface indicating that the biometric data does not correspond to a known user. Based on a determination that the first biometric data corresponds to an entry among the plurality of known user entries and that the known user is not an authorized user, generate a second response different from the error response at the user interface while maintaining the locking bolt in the locked position.

In another embodiment, a method of using a biometric wireless lockset is described. The method includes receiving user access information from a mobile device of an administrative user of the biometric wireless lockset. The user access information edits at least one known user entry of a plurality of known user entries stored in a memory of the biometric wireless lockset. Each known user entry includes a user identity of a known user, fingerprint data, and an indication of whether the known user is an authorized user. The user access information changes the indication in the at least one known user entry from an authorized state to an unauthorized state. First fingerprint data is received on a fingerprint reader integrated into the biometric wireless lockset. The first fingerprint data is compared to stored fingerprint data in the memory of the biometric wireless lockset. Based on a determination that the first fingerprint data corresponds to the at least one known user entry having the indication in the unauthorized state, the following occurs. A notification is generated at the biometric wireless lockset indicating malfunction of the biometric wireless lockset.

In yet another aspect, a biometric wireless electronic lockset is described. The lockset includes a processor, a battery, a memory communicatively connected to the processor, a user interface, a wireless communication interface, a locking bolt movable between a locked and an unlocked position, a motor actuatable by the processing unit to move the locking bolt between the locked and unlocked positions, and a fingerprint reader communicatively coupled to the processing unit and configured to receive fingerprint data. The processor is configured to execute instructions stored in the memory, and the instructions cause the processor to perform the following steps. User access information is received from a mobile device of an administrative user the biometric wireless lockset. The user access information edits at least one known user entry of a plurality of known user entries stored in the memory. Each known user entry includes a user identity of a known user, fingerprint data, and an indication of whether the known user is an authorized user. The user access information changes the indication in the at least one known user entry from an authorized state to an unauthorized state. First fingerprint data is received on the fingerprint reader. The first fingerprint data is compared to stored fingerprint data in the memory, and based on a determination that the first fingerprint data corresponds to the at least one known user entry having the indication in the unauthorized state, the following occurs. A notification is generated at the biometric wireless lockset indicating malfunction of the biometric wireless lockset.

In yet another aspect, a method of using an application for maintaining access of a biometric lockset is described. The method includes receiving a log-in information from a user at an application executable on a mobile device. The application is configured to generate a user interface presentable to the user. The log-in information comprises at least a user ID. The user ID is compared to stored user IDs in a user ID database. The stored user IDs comprise a plurality of known user entries. Each known user entry includes a user identity of a known user, and an indication of whether the known user is an authorized user. The method further includes, based on a determination that the user ID corresponds to an entry among the plurality of known user entries and that the known user is an authorized user, allowing the user to access the application. Based on a determination that the user ID does not correspond to any entries among the plurality of known user entries, generating a first response at the user interface. Based on a determination that the user ID corresponds to an entry among the plurality of known user entries and that the known user is not an authorized user, generating a second response, different from the first response at the user interface.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The present disclosure will be described hereafter with reference to the attached drawings which are given as non-limiting examples only, in which.

DETAILED DESCRIPTION

Figure 1:
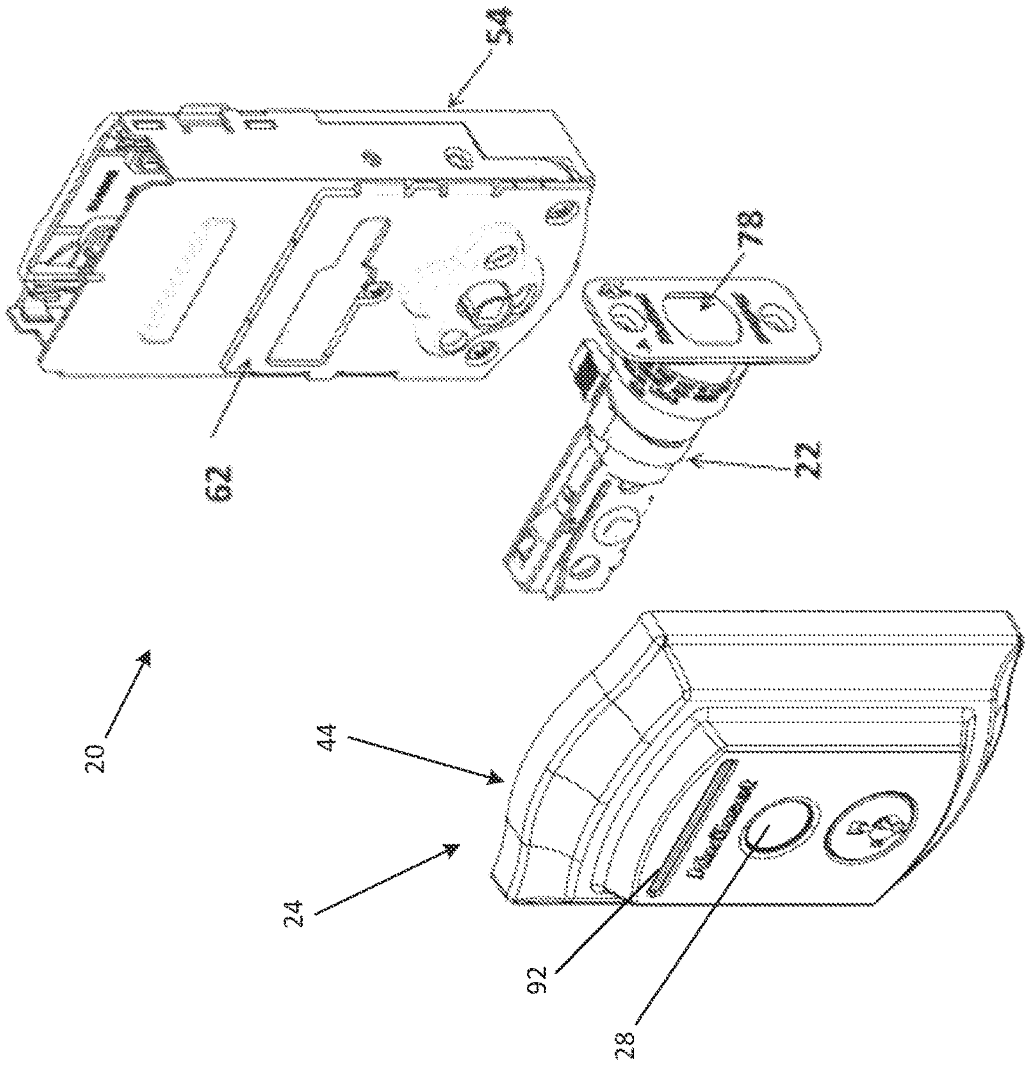
FIG. 1 is a raised perspective view of an exemplary electronic deadbolt with a touch panel for keyless entry according to one embodiment of the invention.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure relates generally to a biometric wireless electronic lockset that, based on the biometric data received, is configured to perform a plurality of operations. Biometric data may be fingerprint data, which is used as an example throughout, although other types of biometric data are contemplated. In an example embodiment, if the biometric data received, for example fingerprint data, is a known and authorized user, the motor actuates the locking bolt to unlock the locking bolt. If the fingerprint data received is not a known user, an error response is generated and the motor does not actuate the locking bolt. If the fingerprint data received is from a known user, but an unauthorized user, a second response, different than the error response, is generated, the motor does not actuate the locking bolt, and a message may transmitted to an administrative user.

The biometric wireless electronic lockset, also referred to herein as a biometric lockset or biometric lock, also provides an administrative user the ability to control other users' ability to unlock the lockset while reducing the other users' awareness of this change in status (e.g., from being an authorized user to now being a known but unauthorized or untrusted user). For example, if an administrative user disables another user's authentication, the other user may not be made aware that they are an unauthorized user, and instead, the lockset provides alternative feedback to the user. Example of alternative feedback may include a low battery warning, an error message, or no feedback at all.

Generally, when an administrative user wants to remove a user's access to the lockset, the administrative user deletes the other user's credentials. A deleted user ceases to have any future access and the lockset responds as if it never stored biometric data associated with that user before. In accordance with the present disclosure, an administrative user may have an ability to either delete another user's credentials or to otherwise preserve that user's credentials but designate that user as an untrusted, or blacklisted, user. An example of such designation is described below in conjunction with FIGS. 6-7. An administrative user may control these settings at an application accessible on a mobile device. A blacklisted user also ceases to have future access, but the lockset retains the biometric data. Instead of notifying the blacklisted user that they have been denied access, the lockset provides a modified user feedback, to the blacklisted user, and optionally provides feedback to the administrative user regarding attempted access by the blacklisted user.

A first example modified user feedback is to provide no user feedback, as if the lockset did not read the biometric data. Another example modified user feedback is to show a low battery indication, so the blacklisted user is led to believe that the blacklisted user still has access, but the lockset could not function properly. Yet another example modified user feedback includes locking the door if the locking bolt was in the unlocked position when the blacklisted user attempted to input their biometric data. Still further, another example modified user feedback may be to provide false status updates, such as always showing the blacklisted user a locked door condition.

In addition to providing modified user feedback, the administrative user is notified when attempted access by a blacklisted user occurs. The administrative user may be notified by sending a message, such as a text or application message, or the lockset plays an alarm tone, shows a high priority notification, or contacts an emergency contact number.

Referring to FIG. 1, a biometric lockset 20 is shown according to one embodiment of the invention. The biometric lockset 20 includes an exterior assembly 24, an electronic deadbolt 22, and an escutcheon 54. The exterior assembly 24 may be mounted on an exterior surface and exposed to the elements. The escutcheon 54 may be mounted on an interior of a dwelling. The electronic deadbolt 22 engages and disengages a deadbolt 78 following input provided by a user into either the exterior assembly 24 or the escutcheon 54.

The exterior assembly 24 preferably receives input at a biometric sensor 28 in the form of a biometric identifier, such as a fingerprint, from a user. The exterior assembly 24 is provided on the front portion of the biometric lockset 20 and may illuminate to display a plurality of responses or signals to the user at a light source 92. The user may touch the biometric sensor 28 to provide a fingerprint. The light source 92 may also selectively illuminate to communicate various messages to the user. For example, the light source 92 may illuminate in white to indicate an operational status, red for a malfunction, flash to indicate an unreadable fingerprint, or any other color/flashing combination. The light source 92 may also be a battery low signal or an error signal. Any other symbols may be used as well to convey messages to the user, indicate battery levels, indicate malfunctions, and indicate operational status. The exterior assembly 24 may further illuminate to display messages or video to allow for communication with a remote person or computer system. In this instance, a camera may be incorporated either directly on the exterior assembly 24 or integrated via a wire or wireless control.

Figure 2:
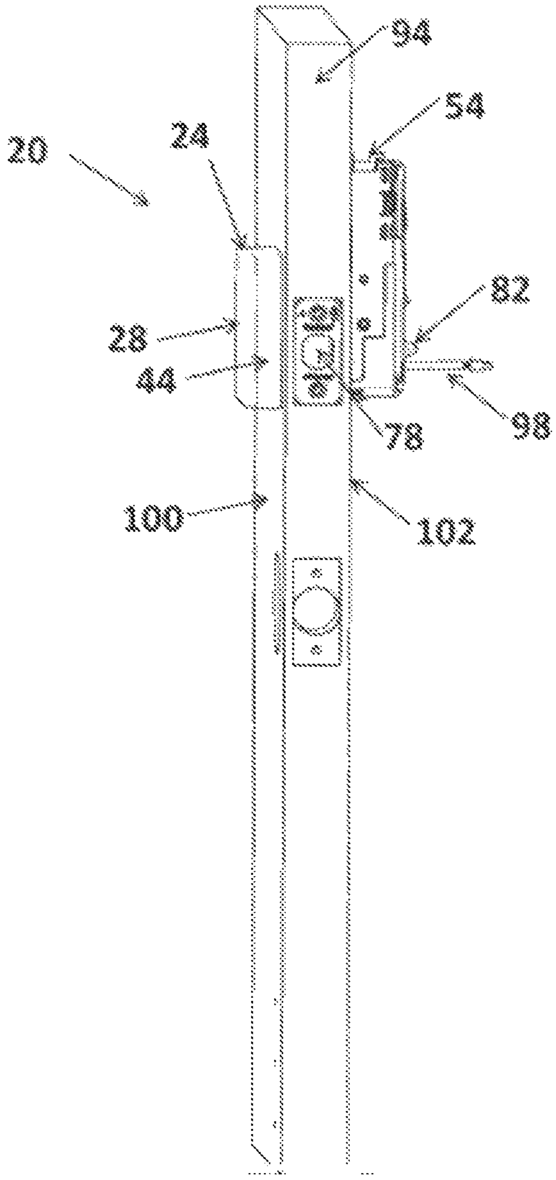
FIG. 2 is a side view of the electronic deadbolt of FIG. 1, as configured in a typical installation in an entry door.

Referring now to both FIG. 1 and FIG. 2, the biometric lockset 20 is preferably installed with the exterior assembly 24 on an exterior side 100 of a door 94. The escutcheon 54 is also preferable installed on an interior side 102 of the same door 94. An interior turn piece 82 may be included on the escutcheon 54 allowing an occupant within the dwelling to engage or disengage the deadbolt 78 manually, without necessitating fingerprint data. The interior turn piece 82 may mechanically engage the deadbolt 78. A cable 98 is preferably used, allowing the exterior assembly 24 to communicate with both the electronic deadbolt 22 and an interior assembly. The cable 98 may pass through the door 94 through a hole bored into the door 94 between the escutcheon 54 and the exterior assembly 24. Alternatively, any known wireless protocol may be used, allowing the exterior assembly 24 to communicate with the electronic deadbolt 22 and escutcheon 54.

In order to prevent unauthorized access to the escutcheon 54 from the exterior side 100 of the door 94, a hardened steel plate 62 may be inserted between the door 94 and the escutcheon 54. The steel plate 62 provides anti-drilling features in the event the exterior assembly 24 is dislodged from the door 94. An added security measure includes forming a housing 44 out of a durable alloy and using fasteners extending through the door 94 to join the housing 44 to the escutcheon 54.

The escutcheon 54 acts as a cover for the interior assembly. The escutcheon may be a decorative piece that can be formed in a variety of shapes, styles, and designs. The escutcheon 54 shown in the figures is merely for purposes of example and is not to be seen as limiting. Likewise, the shape and design of the exterior assembly 24 may be a variety of shapes, styles, and designs.

Although the exterior assembly 24 is described as having a biometric sensor 28, described below, the exterior assembly 24 may have other means of capturing biometric data. For example, a camera may be included to capture retinal data. In a further embodiment, the exterior assembly 24 may include a keypad capable of receiving a code inputted by a user. In such an example embodiment, rather than capturing biometric data, the keypad would capture unique user-identifying data (e.g., a personalized lock code) that is unique to each user.

Figure 3:
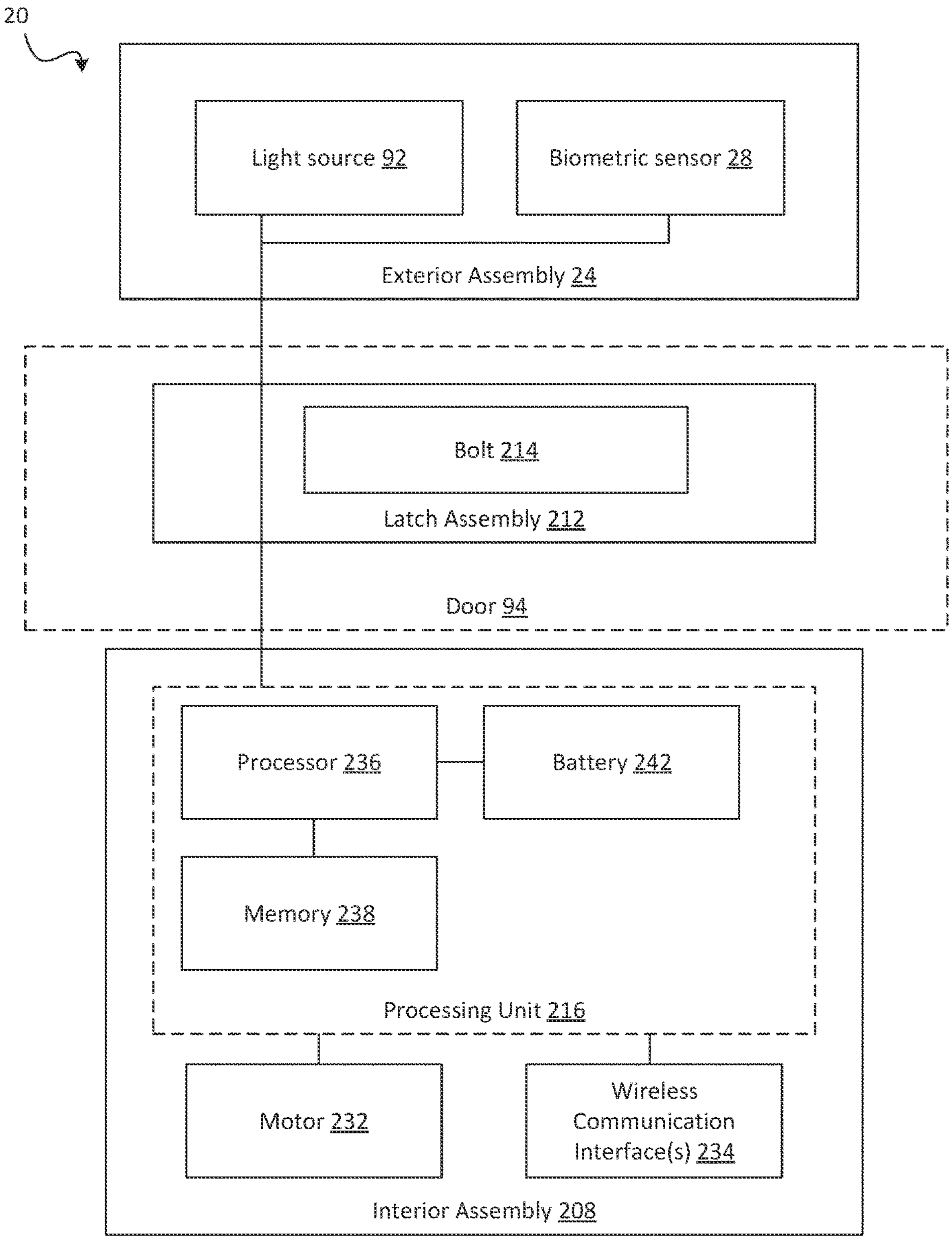
FIG. 3 is a schematic representation of the electronic deadbolt.

FIG. 3 is a schematic representation of portions of the biometric lockset 20 mounted to the door 94. The biometric lockset 20 includes an interior assembly 208, an exterior assembly 24, and a latch assembly 212. For simplicity, certain mechanical features of the biometric lockset 20 are excluded from this depiction, but may be included within such a lockset; the schematic representation is intended to show internal circuit operation of such a lockset having an appearance and mechanical operation as is described above in conjunction with FIGS. 1-2.

In the example shown the exterior assembly 24 includes a biometric sensor 28 and a light source 92. The biometric sensor 28 may be configured to receive biometric data, such as fingerprint data. In another example, a touch panel may be present, instead of or in addition to the biometric sensor 28 that is capable of receiving a code from each user, wherein the code is specific to the user. In use, the biometric sensor 28 receives biometric data from a user and transmits the biometric data to a processing unit 216 for further processing.

The light source 92 is capable of displaying a plurality of messages to a user. For example, a message may include operational status, malfunction indications, battery levels, or other error signals. The light source 92 is in communication with the processing unit 216.

The interior assembly 208 includes the processing unit 216, a motor 232, and one or more wireless communication interfaces 234. As shown, the processing unit 216 includes a processor 236 communicatively connected to memory 238 and a battery 242. The processing unit 216 is located within the interior assembly 208 and is capable of operating the biometric lockset 20, e.g., by actuating the motor 232 to actuate a bolt 214 of the latch assembly 212.

In some examples, the processor 236 can process signals received from the biometric sensor 28 to determine whether the bolt 214 should be actuated and/or the light source 92 should display a message. Such processing can be based on a set of preprogrammed instructions (i.e., firmware) stored in the memory 238. In an example embodiment, the processing unit 216 is configured to capture fingerprint data received at the biometric sensor 28 from a user and store the fingerprint data in the memory 238.

Figure 6:
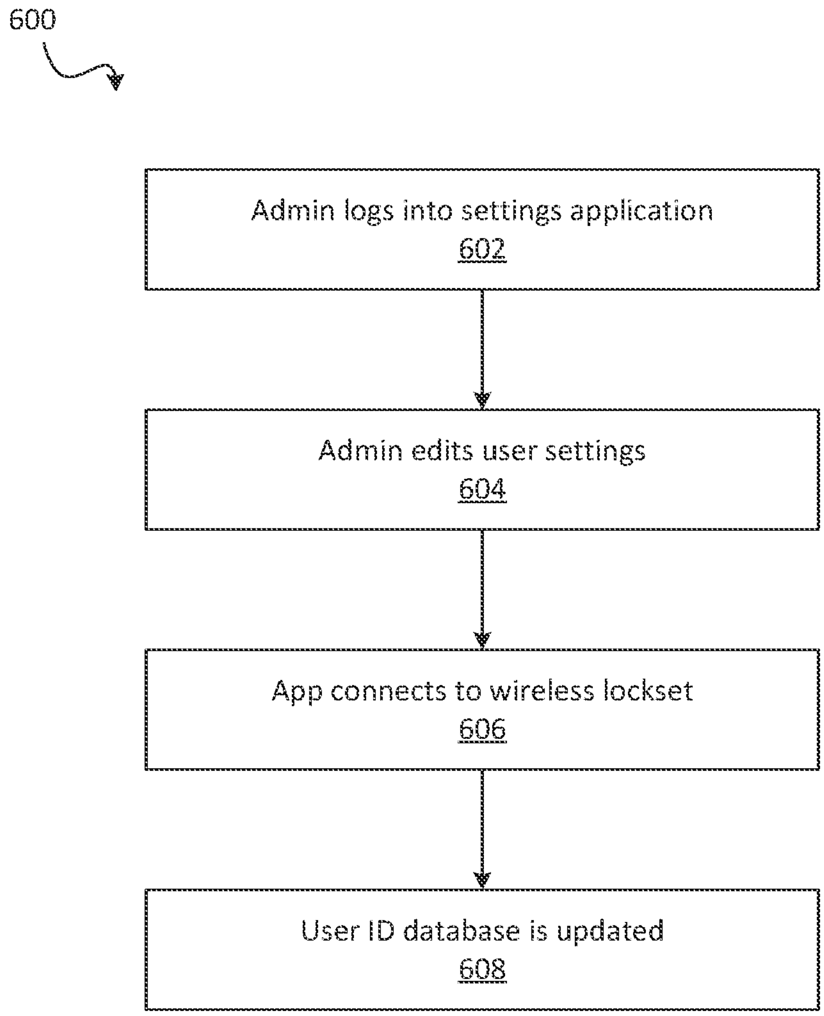
FIG. 6 is an example method of editing the user ID database.

Preprogrammed instructions can include a list of known users including authorized users and unauthorized users, and how to proceed after receiving biometric data, such as fingerprint data, which is described in more detail at FIG. 6. For example, fingerprint data corresponding to a known and authorized user causes the motor 232 to actuate the bolt 214. Conversely, fingerprint data corresponding to an unknown user causes a user interface 214 to display an error message and not actuate the bolt 214. Fingerprint data corresponding to an unauthorized user causes the user interface 214 to display a predetermined message, and not actuate the bolt 214 (or immediately lock the bolt 214). Optionally, fingerprint data corresponding to an unauthorized user causes the electronic lock to send a message to an administrative user.

The memory 238 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

The interior assembly 208 includes the battery 242 to power the biometric lockset 20. In one example, the battery 242 may be a standard single-use (disposable) battery. Alternatively, the battery 242 may be rechargeable.

The interior assembly 208 also includes the motor 232 that is capable of actuating the bolt 214. In use, the motor 232 receives an actuation command from the processing unit 216, which causes the motor 232 to actuate the bolt 214 from the locked position to the unlocked position or from the unlocked position to the locked position. In some examples, the motor 232 receives a specified lock or unlock command, where the motor 232 only actuates the bolt 214 if the bolt 214 is in the correct position. For example, if the door 94 is locked and the motor 232 receives a lock command, then no action is taken. If the door 94 is locked and the motor 232 receives an unlock command, then the motor 232 actuates the bolt 214 to unlock the door 94.

The interior assembly 208 also includes the wireless communication interfaces 234 that are in communication with the processing unit 216. In various embodiments, the wireless communication interfaces 234 may include, for example, a WiFi (IEEE 802.11x) interface, a Bluetooth interface, or any of a variety of other interfaces that may allow for communication between the biometric lockset 20 and a mobile device that executes software usable for configuration and management of settings that may be used by the biometric lockset 20. In use, when the processing unit 216 receives a fingerprint event from a user and stores the fingerprint event in the memory 238, and the fingerprint event is determined to be from an unknown user or an unauthorized user, the processing unit 216 sends this information to the wireless communication interface 234. The wireless communication interface 234 transmits a message to a mobile device of an administrative user, notifying that administrator of the fingerprint event. The wireless communication interface 234 is also able to connect to a mobile device, e.g., either remotely via WiFi or locally via a Bluetooth connection, to update information stored in the memory 238 as needed.

Figure 4:
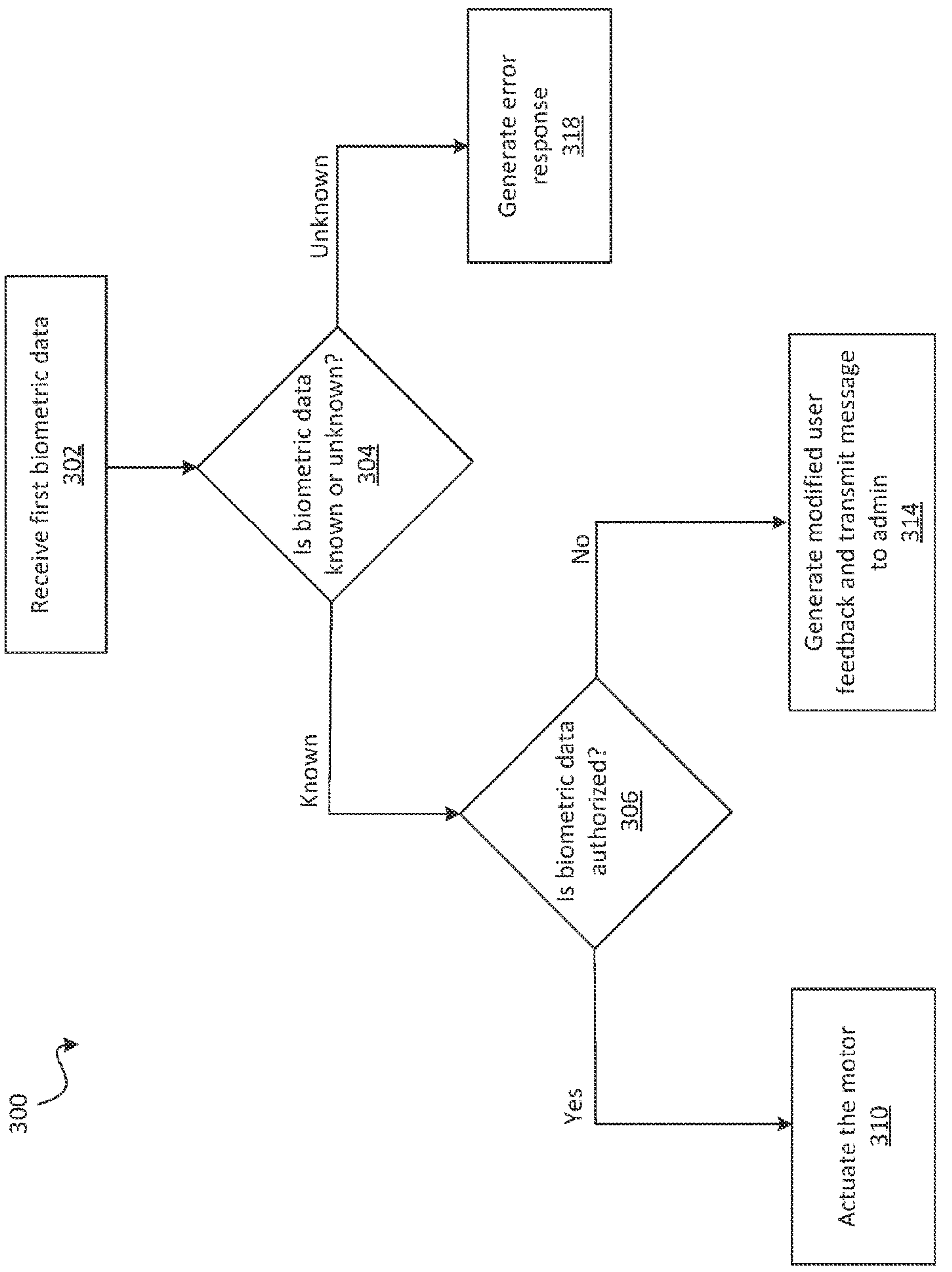
FIG. 4 is an example method of using the electronic deadbolt as described herein.

FIG. 4 illustrates a method 300 of operating of a lockset, such as the biometric lockset 20 as described herein. At 302, first user-identifying data is received. The user-identifying data can be, for example biometric data. For example, if the biometric data is fingerprint data, the user presses their fingerprint to the biometric sensor 28, and the fingerprint data is transmitted to the processing unit 216 for processing. The method 300 is described using fingerprint data as the example type of biometric data.

At 304, it is determined whether the biometric data (or other user-identifying data) is known or unknown. The first biometric data is compared to stored biometric data in the memory 238 of the lockset, which is described in more detail at FIG. 5. The stored biometric data comprises a plurality of known user entries. Each user entry includes a user identity of a known user, biometric data (e.g., fingerprint data), and an indication of whether the known user is an authorized user. A known user may be an authorized user or an unauthorized user, as described below. An unauthorized user may also be referred to as a blacklisted user.

If the first biometric data corresponds to a known user, then it is determined if the first biometric data corresponds to an authorized user or an unauthorized user at step 306. At step 306, the first biometric data is compared to a data store having a listing of all known users, both authorized and unauthorized, with associated biometric data for each known user.

If it is determined that the first biometric data corresponds to an authorized user, then the method proceeds to step 310, and the motor of the biometric lockset 20 is actuated. The actuation causes the motor to move the locking bolt from the locked position to the unlocked position, so the user can enter the dwelling. The actuation may alternatively cause the motor to move the locking bolt from the unlocked position to the locked position.

If it is determined that the first biometric data corresponds to a known, but unauthorized user, then the process proceeds to step 314. At step 314, a modified user feedback is provided, such as an error response, and a message may be transmitted to an administrative user. An example error response may be that the battery is low, the biometric sensor failed to accurately read the biometric (e.g., fingerprint) data, or other lockset malfunction. Notably, in certain embodiments, the error response does not indicate to the user that their fingerprint data corresponds to an unauthorized user, but rather indicates to that user that the lock is unable to actuate to an unlocked position. Such errors may be presented despite the fact that such errors have not actually occurred, e.g., a low battery indication, in the form of a particular flashing or colored light emitted by the light source 92, may be presented despite the battery having a remaining capacity above a low battery threshold. Furthermore, the failed biometric reading operation (e.g., a different sequence or feedback pattern emitted by the light source 92) may be presented despite a successful fingerprint scan.

Additionally, a message that is transmitted to the administrative user notifies the administrative user that an unauthorized user is attempting to actuate the biometric lockset. Example notifications include sending a message, such as a text or application message, or the lockset plays an alarm tone, shows a high priority notification, or contacts an emergency contact number.

If it is determined that the first fingerprint data does not correspond to a known user (e.g., the fingerprint data does not match any known users), then at step 318, an error response is generated. The error response is generated at the user interface and indicates that the fingerprint data does not correspond to a known user or that the biometric lockset does not recognize the fingerprint. In an embodiment, a message may be transmitted to an administrative user. The error response generally can correspond to a traditional notification to the user that the user is an unknown user, indicating that there is no entry within the stored user entries at the biometric lockset 20 corresponding to that user.

A similar process as shown in FIG. 4 is used to determine whether a user is granted access to an application executable on a mobile device associated with the lockset. In contrast to utilizing biometric data to determine whether a user is a known and authorized user, the application utilizes a user ID to determine whether a user is a known and authorized user.

If the user ID corresponds to a known user, then it is determined if the user ID corresponds to an authorized user or unauthorized user. If the user ID corresponds to an authorized user, the user is able to access the application. If the user ID is associated with an administrative user, the user is granted full access to the application, for example, full editing of user account information, including the ability to edit or modify usage rights of other users of the lockset. If the user ID is not associated with an administrative user, the user is granted limited access to the application, for example, having editing access only for the user themselves, and not seeing certain access rights of other users or certain access rights of their own.

In a further embodiment, authorized users may be split into three categories, each with different application permissions. A user can see and manage their own settings in the application. An administrative user can see and manage their own settings and see and manage the setting of other user, but not of other administrative users or an owner user. An owner user can see and manage the settings of any and all users.

If it is determined that the user ID corresponds to an unknown user or an unauthorized user, a response is presented on the user interface and the user is not able to access the application. Example responses include that the application cannot connect to a server, an indication that the lockset is not within range, an unknown error, or that the servers are overloaded, such as is seen in the example user interface of FIG. 9. Notably, the response does not indicate to the user that their user ID is associated with an unknown user or an unauthorized user.

Additionally, a message may be transmitted to the administrative user that notifies the administrative user that an unauthorized user is attempting to log into the lockset application. Example notifications include sending a message, such as a text or application message.

Figure 5:
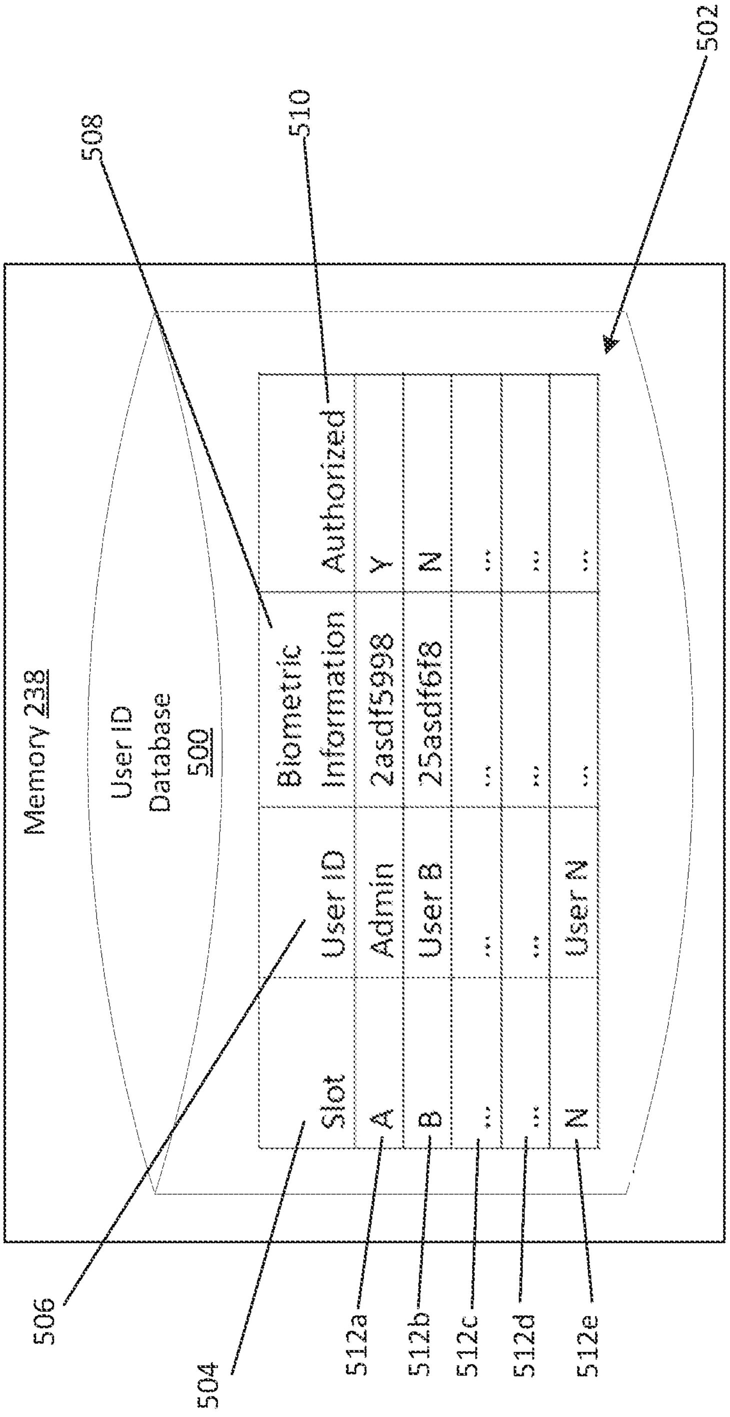
FIG. 5 is an example block diagram of a memory of the electronic deadbolt.

FIG. 5 illustrates an example memory 238 that may store a user ID database 500 useful to determine whether the received biometric data corresponds to a known or unknown user, and an authorized or unauthorized user. The memory 238 is maintained within the biometric lockset 20, as noted above.

In the example shown, the user ID database 500 maintains a table 502 of information corresponding to known users of the lockset. The user ID database 500 includes a predetermined number of memory slots 504, wherein each memory slot 504 stores a set of information unique to an individual user. The memory 238, and specifically the user ID database 500, is functional in a programming mode and a comparison mode. In the programming mode, the set of information unique to an individual is capable of being edited by an administrative user (e.g., by being accessed via a mobile device or synchronized with settings within a mobile application controlled by that administrative user). In the comparison mode, the user ID database 500 is used to compare biometric data received at a biometric sensor with the information stored in the table 502.

The table 502 maintains information corresponding to individual users. The table 502 includes multiple memory slots 504, a user identification field 506, biometric information 508, and an authorization indication 510 for each user. Each memory slot 504 stores a set of information unique to an individual user. In the example shown, slots 512*a*, 512*b*, 512*c*, 512*d*, 512*e* each correspond to a unique and individual user. The user identification field 506 stores the identity of each user. The identity of each user may correspond to a name, or other means of identification, such as "administration," or "user A."

Biometric information 508 is unique to each individual user and is stored in the table 502. In an example embodiment, biometric information 508 may be fingerprint data. Other types of biometric information 508 may be used, such as palm veins, facial recognition, palm prints, hand geometry, iris recognition, and retinal recognition. In yet a further embodiment, rather than biometric information, unique user information may be used, such as a code that may be enterable at a touch panel and is unique to each individual user.

Whether or not a user is an authorized user is stored at authorization indication 510. An authorized user is a user that is authorized to actuate the lockset. An unauthorized user is a user that is a known user, but is not allowed to actuate the lockset. An administrative user determines which known users are authorized users, and which known users are unauthorized users.

In some example embodiments, the table 502 may store additional information, for example a time at which a user entry is adjusted from being a known, authorized user to being a known but unauthorized user. In such instances, the biometric lockset 20 may periodically adjust entries in the electronic lockset to remove known, unauthorized users after a predetermined period of time. For example, in some instances, biometric information of individuals may not be retained for more than 30-60 days after that user revokes authorization to use his or her information. In particular embodiments, the length of time such biometric information may be retained is either programmable or automatically adjusted at the lockset due to any applicable local data privacy regulations. As entries in the biometric lockset 20 may be deleted due to age, the electronic lockset may notify a remote server that stores a portion of a similar table 502, which may include less than all of the information in table 502. Maintaining a copy of a portion of table 502 at a remote server may allow an administrative user to remotely edit table settings (i.e., adjust access rights of other users) without requiring a direct connection to the biometric lockset, as is discussed below in conjunction with FIG. 6.

FIG. 6 shows an example method 600 of editing the table 502 stored in the user ID database 500 by an administrative user. In an example embodiment, the administrative user is able to edit settings associated with the lockset at a mobile device. A mobile application may be associated with the biometric lockset and is accessible by the administrator's mobile device.

At step 602, the administrative user logs into an application associated with the biometric lockset. The administrative user may log into the application to edit certain settings or user data associated with the biometric lockset.

In an embodiment, the user does not need to be within wireless communication range of the biometric lockset to edit the settings. In such an embodiment, a copy of the table 502 (or at least some portion thereof, including user IDs and the authorized/unauthorized status identifiers) will be synchronized to a mobile device of the administrator to be managed by the application. Generally, to the extent that biometric data is captured by the biometric lockset, that biometric data will be maintained within the table 502 at the biometric lockset, and would not be transmitted to the copy of the table 502 at the mobile device to ensure secure storage of that biometric data.

In an alternative embodiment, the administrative user would only be able to access and edit settings that are stored in the table 502 on the biometric lockset when in communication with the biometric lockset. In such circumstances, a communication session may be established, e.g., via a Bluetooth connection between a mobile device of the administrative user and the biometric lockset, to allow the mobile application to access data stored in the table 502 for editing. In such an arrangement the mobile device associated with the administrative user would still obtain a portion of the table 502 (e.g., absent the biometric information) to be edited and resynchronized with the biometric lockset 20.

At step 604, the administrative user edits user settings. For example, an administrative user may add an additional known user, the known user may be an unauthorized user or an unauthorized user. An administrative user may also remove user information from the table 502, therefore making the user an unknown user going forward. Still further, an administrative user may change the authorization status of a user.

At step 606, a mobile device of an administrative user connects to the biometric lockset (if not already connected). In a first example, the mobile application connects wirelessly to the biometric lockset via the wireless communication interface 234. As noted above, this may occur at the time the administrative user edits user settings, or at some time after editing of the user settings. If occurring after editing of the user settings, connection of the mobile application to the biometric lockset will synchronize changes from the portion of table 502 maintained at the administrator's mobile device to the biometric lockset, e.g., to cause updates to the table 502 in the biometric lockset at the time of connection. A method of securely establishing a communication connection between a mobile device and an electronic lockset such as biometric lockset 20 is discussed in U.S. Provisional Patent Application No. 63/241,804, entitled "Establishment of Secure Bluetooth Connection to Internet of Things Devices, Such as Electronic Locks", the disclosure of which is hereby incorporated by reference in its entirety.

At step 608, after the mobile application is connected to the biometric lockset, information associated with each user entry in the database stored in the memory is updated based on the edits made by the administrative user. Accordingly, either during connection to the biometric lockset or in an "offline" configuration, the administrator may edit or change permissions or known/unknown status of users of the biometric lock.

Figure 7:
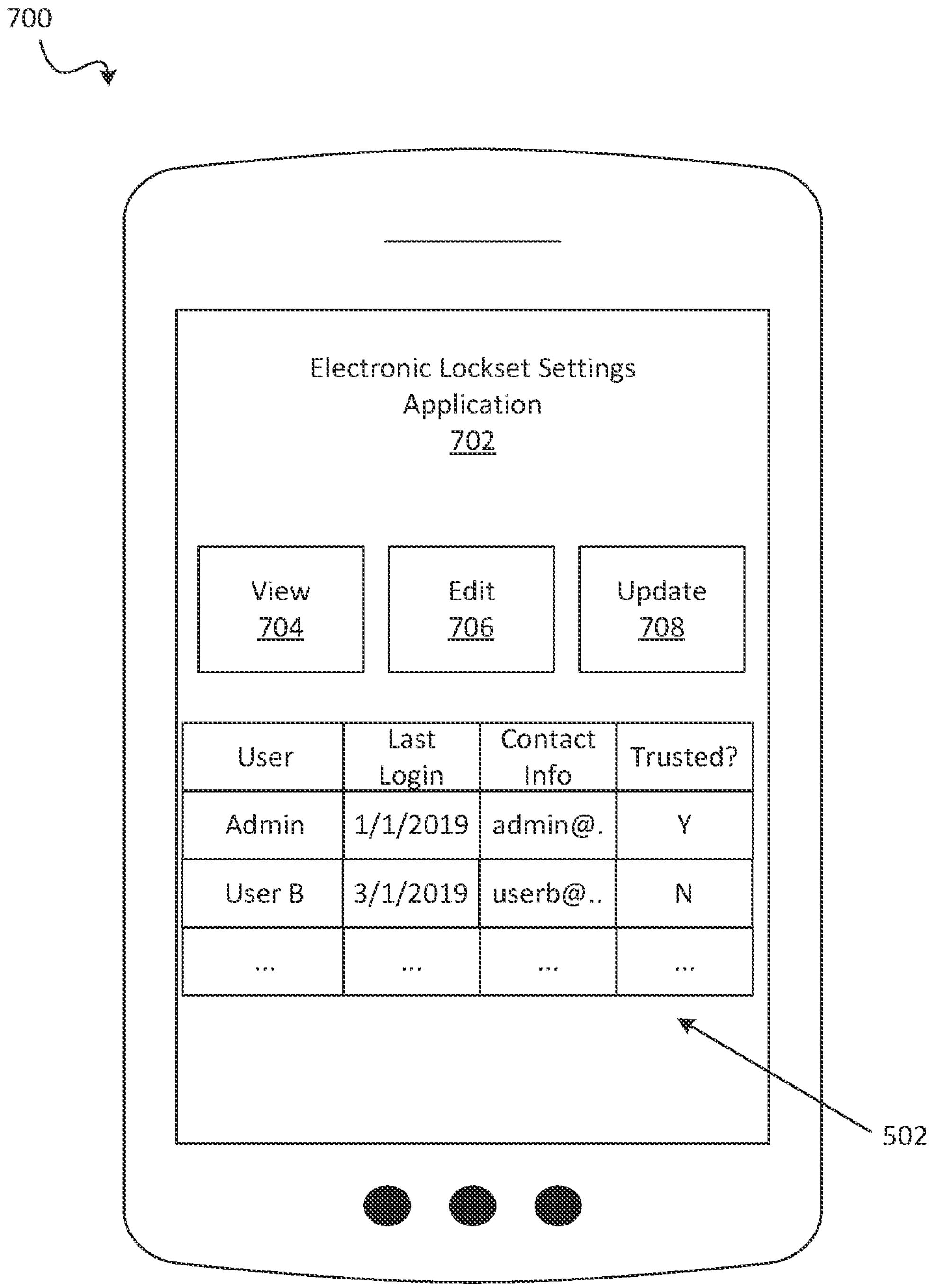
FIG. 7 illustrates an example user interface for an administrative user.

FIG. 7 illustrates an example user interface 700 of a mobile application 702 used to edit user settings by the administrative user. The mobile application 702 includes the ability to view settings 704, edit settings 706, and update settings 708. The mobile application 702 also includes the table 502 comprising user information.

For example, an administrative user may just want to view user information by selecting view settings 704. The administrative user may also edit setting 706, which allows the administrative user to make changes as desired with regard to other users. The administrative user can remove a user, so that user is no longer recognized by the lockset. The administrative user can change the authorization status of a user, so a previously authorized user is now an unauthorized user, or vice versa.

When the administrative user is done editing user setting, the administrative user can select to update settings 708. Selecting the update setting 708 indicates to the application that it should connect to the biometric lockset to update the information stored in memory. Once the settings are updated on the mobile app, the table 502 can be updated in the memory 238 of the lockset.

In a further embodiment comprising three categories of users, a user interface 700 for a user that is not the administrative user may include the same ability to view settings 704, edit settings 706, and update settings 708, but only for the user themselves. A user interface 700 for an administrative user may include the ability to view settings 704, edit settings 706, and update settings 708 for other users, but not other administrative users. A user interface 700 for an owner user may include the ability to view settings 704, edit settings 706, and update settings 708 for all users.

Figure 8:
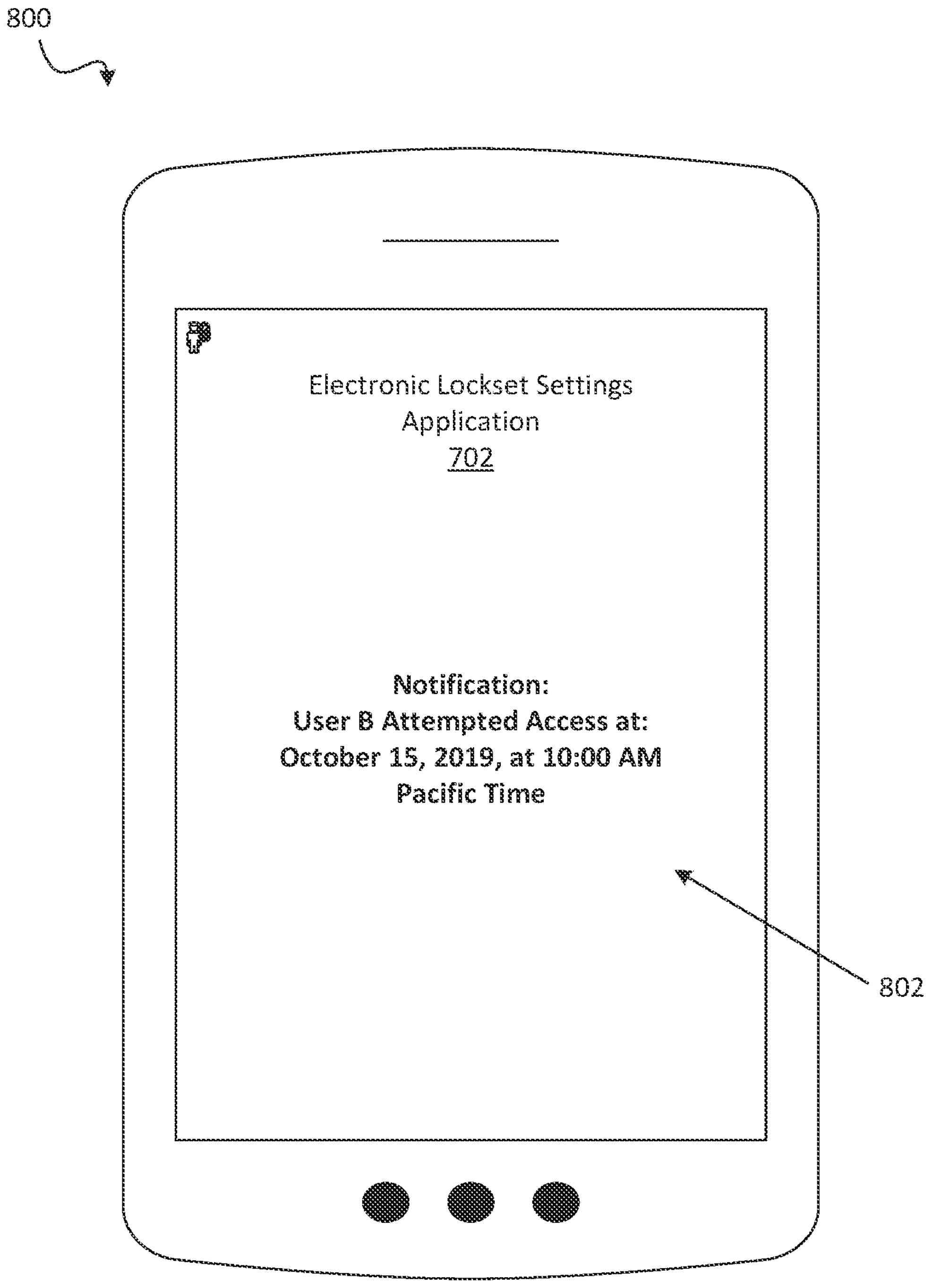
FIG. 8 illustrates a further example user interface for an administrative user receiving a notification regarding access by a known, unauthorized user.

FIG. 8 illustrates a further example user interface 800 of a mobile device that may be communicatively connected to the biometric lockset. In this example, the biometric lockset may be configured to transmit (e.g., via a wireless interface) a notification to the mobile device in response to an access attempt by an unauthorized user. In this example, the user interface 800 of mobile application presentable to the administrator displays a notification 802 indicating an attempted access attempt by a known but unauthorized user. This may occur, for example as part of step 314 of FIG. 4, in which the biometric lock generates modified user feedback, and notifies the administrative user of attempted access by the known but unauthorized user. In the example shown, the mobile application of the administrative user may receive a notification of the identity of the known but unauthorized user as well as a time of attempted access. Other information may be presented as well, depending on the capabilities of the biometric lock. For example, a photograph may be presented if the biometric lock also includes a camera. Still further, the mobile application may generate a notification to the administrative user, e.g., in a notification bar (a schematic example of which is shown in FIG. 8).

Figure 9:
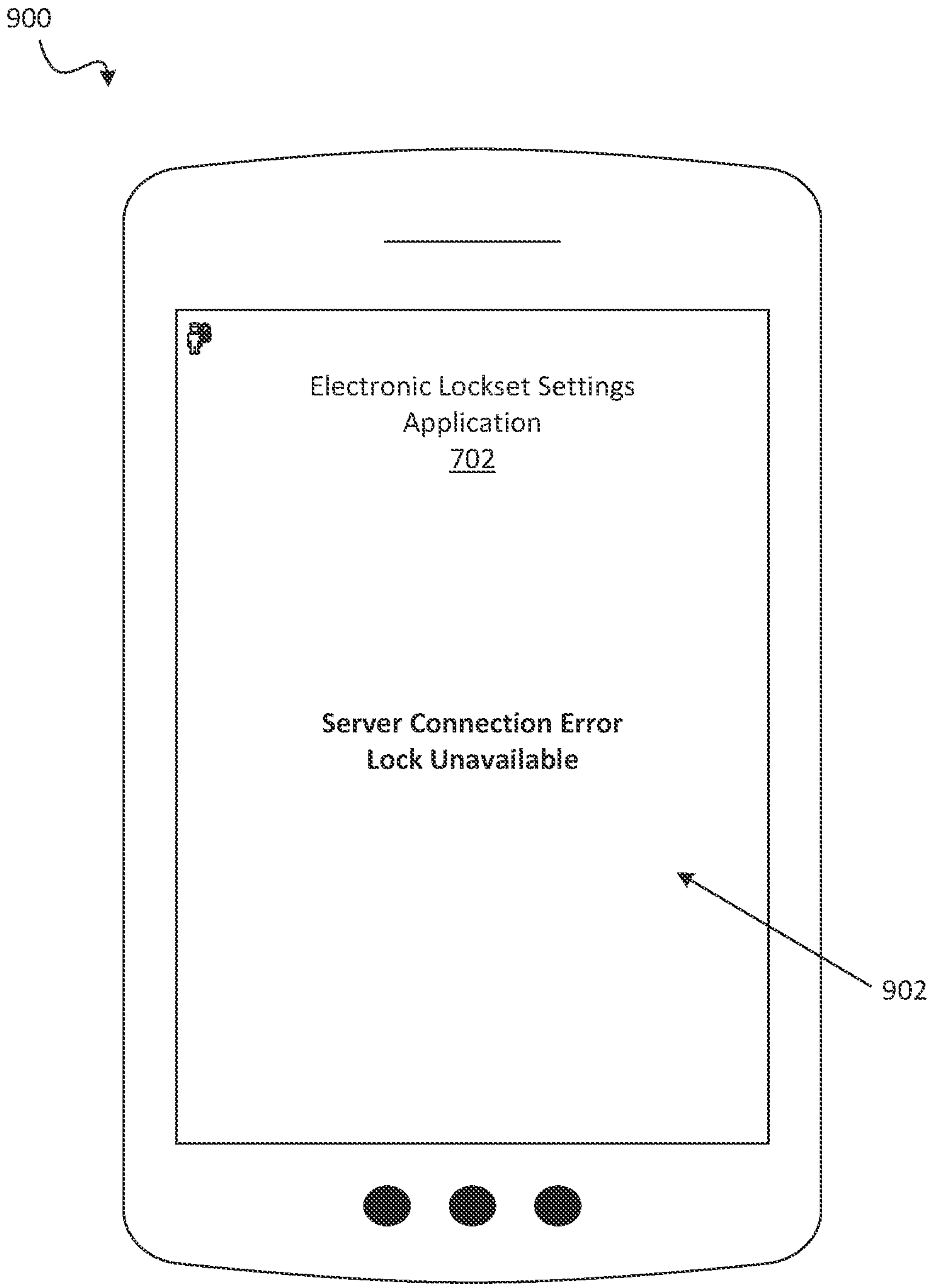
FIG. 9 illustrates a further example user interface for a known, unauthorized user.

FIG. 9 illustrates a still further example user interface 900 of a mobile device that may be communicatively connected to the biometric lockset. In this example, a notification may be sent to the mobile device in response to attempted access of lock settings or attempted remote actuation of an electronic lock by a known, unauthorized user. As compared to the user interface 800 of FIG. 8 (which is presented to an administrative user), the user interface 900 presents a message 902 indicating an error in connection between the mobile device and the biometric lockset. Other messages may also be presented (e.g., indicating an error of connectivity between the mobile device and the biometric lockset or an error in operation of the biometric lockset itself, such as a low battery indication). Such a message may be presented to the user in combination with, or instead of, an error being presented at the electronic lockset. Accordingly, a known, unauthorized user may opt to try to actuate the biometric lockset using either an access mechanism at the lockset or remotely via a mobile device, and may receive either a notification at the lockset or on a mobile device in accordance with the methods described herein.

Referring to FIGS. 1-9 generally, although discussed in the context of a biometric (e.g., fingerprint-sensing) lock, it is noted that the present disclosure is not so limited. For example, a known but unauthorized user may be a user having a previously-assigned user code which is invalidated by an administrator at an electronic lock having individually-assigned PIN codes for each user. Additionally, other types of information unique to a particular user may be used for unlocking an electronic lock, and may similarly be used to uniquely identify, not just known and authorized users for purposes of unlocking an electronic lockset, but also known but untrusted users who may trigger the processes described herein for managing such untrusted users.

Still referring to FIGS. 1-9 generally, it is noted that the present application presents a number of advantages over existing residential locksets, and in particular, biometric locksets used in residential contexts. For example, while typically untrusted users are deleted from memory of a lock, causing the user to be unknown, in the present system, the user remains known but becomes untrusted, so that subsequent attempts to access the lock allow an administrative user to know the identity of a previously authorized individual who is attempting to unlock the lock. Still further, the modified feedback to the known but unauthorized user may avoid causing distress to the unauthorized user, since they may not realize that they have been designated as unauthorized, but instead simply believe that the lock may be malfunctioning. Additionally, although described in the context of a biometric lockset, it is recognized that features of the present application may be implemented using other types of electronic locksets capable of uniquely identifying particular users, e.g., through use of particularized access codes, mobile identities, or other features.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. An electronic lockset, comprising:
- a processor;
- a battery;
- a memory communicatively connected to the processor;
- a user interface;
- a locking bolt movable between a locked position and an unlocked position; and
- a motor actuatable by the processor to move the locking bolt between the locked and unlocked positions;
- wherein the processor is configured to execute instructions stored in the memory, the instructions causing the processor to perform:
  - receiving a lock code input by a user;
  - comparing the lock code to stored lock code data in the memory, the stored lock code data comprising a plurality of known user entries, each known user entry including a user identity of a known user, an assigned lock code, and an indication of whether the known user is an authorized user;
  - based on a determination that the lock code input by the user corresponds to an assigned lock code included among the plurality of known user entries and that the known user is an authorized user, actuating the motor to move the locking bolt from the locked position to the unlocked position;
  - based on a determination that the lock code input by the user does not correspond to any assigned lock codes among the plurality of known user entries, generating an error response at the user interface indicating that the lock code input by the user does not correspond to a known user; and
  - based on a determination that the lock code input by the user corresponds to an assigned lock code included among the plurality of known user entries and that the known user is not an authorized user, generating a second response different from the error response at the user interface while maintaining the locking bolt in the locked position.

2. The electronic lockset of claim 1, further comprising a keypad configured to receive the lock code.

3. The electronic lockset of claim 1, further comprising a wireless communication interface.

4. The electronic lockset of claim 3, wherein the processor is further configured to transmit a message to an administrative user of the electronic lockset when the determination that at least one known user entry has the indication of an unauthorized user.

5. The electronic lockset of claim 4, wherein the message is one of an e-mail, a text message, a voice message, or a notification within a mobile application.

6. The electronic lockset of claim 3, wherein the instructions further cause the processor to perform:
- receiving a modification to at least one of the plurality of known user entries from a mobile device via the wireless communication interface.

7. The electronic lockset of claim 6, wherein the modification comprises a change to at least one of the plurality of known user entries to indicate that a user corresponding to the at least one known user entry is not an authorized user.

8. The electronic lockset of claim 1, wherein the second response comprises a notification at the lockset indicating malfunction of the lockset.

9. The electronic lockset of claim 1, further comprising:
a low battery indicator communicatively connected to the processor,
wherein the second response is an indication of low battery from the low battery indicator.

10. The electronic lockset of claim 9, wherein the indication of low battery occurs despite the battery having a remaining capacity above a low-battery threshold.

11. A wireless electronic lockset, comprising:
a processor;
a battery;
a memory communicatively connected to the processor;
a user interface;
a wireless communication interface;
a locking bolt movable between a locked position and an unlocked position; and
a motor actuatable by the processor to move the locking bolt between the locked and unlocked positions;
wherein the processor is configured to execute instructions stored in the memory, the instructions causing the processor to perform:
receiving a lock code input by a user;
comparing the lock code to stored lock code data in the memory, the stored lock code data comprising a plurality of known user entries, each known user entry including a user identity of a known user, an assigned lock code, and an indication of whether the known user is an authorized user;
based on a determination that the lock code input by the user corresponds to an assigned lock code included among the plurality of known user entries and that the known user is an authorized user, actuating the motor to move the locking bolt from the locked position to the unlocked position;
based on a determination that the lock code input by the user does not correspond to any assigned lock codes among the plurality of known user entries, generating an error response at the user interface indicating that the lock code input by the user does not correspond to a known user; and
based on a determination that the lock code input by the user corresponds to an assigned lock code included among the plurality of known user entries and that the known user is not an authorized user, generating a notification at the lockset indicating malfunction of the lockset.

12. The wireless electronic lockset of claim 11, wherein the instructions further cause the processor to perform:
receiving a modification to at least one of the plurality of known user entries from a mobile device via the wireless communication interface.

13. The wireless electronic lockset of claim 12, wherein the modification comprises a change to at least one of the plurality of known user entries to indicate that a user corresponding to the at least one known user entry is not an authorized user.

14. The wireless electronic lockset of claim 11, further comprising a keypad configured to receive the lock code.

15. The wireless electronic lockset of claim 14, wherein the keypad comprises a touch panel.

16. The wireless electronic lockset of claim 11, wherein, within the stored lock code data, each known user entry includes the assigned lock code, which is unique to the known user entry.

17. The wireless electronic lockset of claim 11, wherein the battery is at least one of a single-use battery or a rechargeable battery.

18. The wireless electronic lockset of claim 11, wherein the wireless communication interface comprises at least one of a WiFi interface or a Bluetooth interface.

19. The wireless electronic lockset of claim 11, wherein the processor is further configured to transmit a message to an administrative user of the electronic lockset via the wireless communication interface when the determination that at least one known user entry has the indication of an unauthorized user.

20. The wireless electronic lockset of claim 11, wherein generating the notification occurs without actuating the locking bolt from the locked position to the unlocked position.

* * * * *